United States Patent
Jiang et al.

(10) Patent No.: US 12,137,058 B2
(45) Date of Patent: Nov. 5, 2024

(54) INFORMATION PROCESSING METHOD, ETHERNET SWITCHING CHIP AND STORAGE MEDIUM

(71) Applicant: SUZHOU CENTEC COMMUNICATIONS CO., LTD., Jiangsu (CN)

(72) Inventors: Zhen Jiang, Jiangsu (CN); Peiyu Fang, Jiangsu (CN); Wei Zhou, Jiangsu (CN); Xinglong Cui, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 341 days.

(21) Appl. No.: 17/793,426

(22) PCT Filed: Sep. 7, 2020

(86) PCT No.: PCT/CN2020/113731
§ 371 (c)(1),
(2) Date: Jul. 18, 2022

(87) PCT Pub. No.: WO2021/147332
PCT Pub. Date: Jul. 29, 2021

(65) Prior Publication Data
US 2023/0042387 A1    Feb. 9, 2023

(30) Foreign Application Priority Data

Jan. 22, 2020    (CN) .......................... 202010075350.X

(51) Int. Cl.
*H04L 49/351*    (2022.01)
*H04L 49/109*    (2022.01)

(52) U.S. Cl.
CPC .......... *H04L 49/351* (2013.01); *H04L 49/109* (2013.01)

(58) Field of Classification Search
CPC ..... H04L 49/351; H04L 49/109; H04L 49/10; H04L 49/1523
(Continued)

(56) References Cited

U.S. PATENT DOCUMENTS 7,369,557 B1    5/2008    Sinha
8,498,297 B2 *  7/2013    Bragg ................. H04L 49/3009
                                                             370/386

(Continued)

FOREIGN PATENT DOCUMENTS

CN    102611519 A    7/2012
CN    104079488 A    10/2014
(Continued)

OTHER PUBLICATIONS

International Search Report for corresponding application PCT/CN2020/113731 filed Sep. 7, 2020; Mail date Nov. 27, 2020.

*Primary Examiner* — Candal Elpenord
(74) *Attorney, Agent, or Firm* — Samson G. Yu

(57)    ABSTRACT

An information processing method, an Ethernet switching chip, and a storage medium are provided. The method includes: receiving, by a master module of an Ethernet switching chip, a message information processing request, and executing, by the master module in response to the message information processing request, a self-learning operation corresponding to the message information processing request, so as to obtain a message information learning result; updating, by the master module according to the message information learning result, a message processing information table of an IP core where the master module is located; and/or, sending, by the master module, the message information learning result to a corresponding slave module, so that the corresponding slave module updates, according to the message information learning result, a (Continued)

message processing information table of an IP core where the slave module is located.

20 Claims, 5 Drawing Sheets

(58) Field of Classification Search
USPC .......................................................... 370/389
See application file for complete search history.

(56) References Cited

U.S. PATENT DOCUMENTS

| | | | | |
|---|---|---|---|---|
| 2007/0195793 | A1* | 8/2007 | Grosser | H04L 63/0236 370/395.53 |
| 2008/0068985 | A1* | 3/2008 | Mieno | H04L 12/66 370/217 |
| 2008/0225853 | A1* | 9/2008 | Melman | H04L 12/46 370/392 |
| 2008/0285555 | A1* | 11/2008 | Ogasahara | H04L 49/357 370/389 |
| 2009/0147672 | A1* | 6/2009 | Chun | H04L 12/437 370/225 |
| 2010/0042759 | A1 | 2/2010 | Srinivasan et al. | |
| 2011/0122762 | A1* | 5/2011 | Wu | H04L 12/4625 370/218 |
| 2014/0153577 | A1 | 6/2014 | Janakiraman et al. | |
| 2014/0301403 | A1* | 10/2014 | Yabe | H04L 45/54 370/410 |
| 2015/0003448 | A1* | 1/2015 | Swinkels | H04L 49/602 370/389 |
| 2019/0286737 | A1* | 9/2019 | Pan | G06F 9/545 |
| 2020/0366625 | A1* | 11/2020 | Ballard | H04L 45/245 |

FOREIGN PATENT DOCUMENTS

| | | |
|---|---|---|
| CN | 104244305 A | 12/2014 |
| CN | 108134855 A | 6/2018 |
| CN | 111277518 A | 6/2020 |

* cited by examiner

Fig. 1

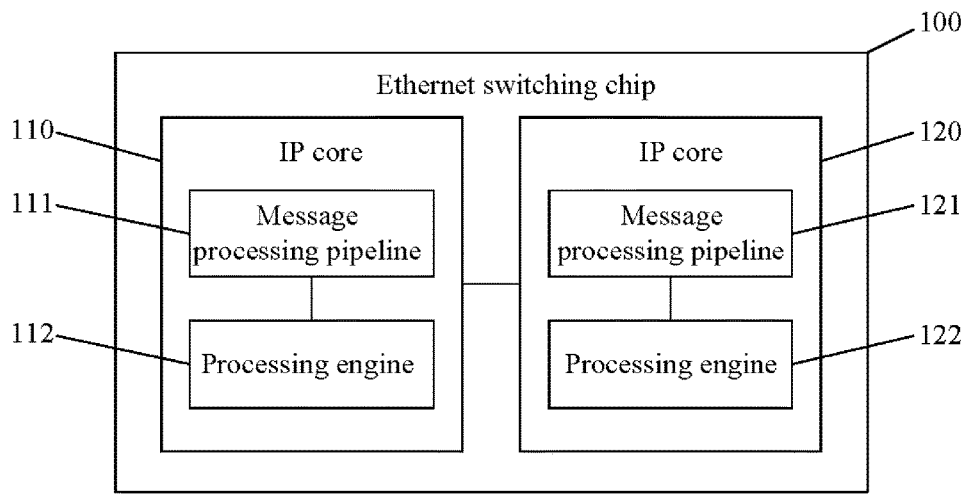

Fig. 2

| A master module of an Ethernet switching chip receives a message information learning request, wherein the Ethernet switching chip contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; and the master module is a second processing module among all second processing modules | ⟵ 201 |

| In response to the received message information learning request, the master module executes a self-learning operation corresponding to the message information learning request, so as to obtain a message information learning result | ⟵ 202 |

| According to the message information learning result, the master module updates the message processing information table of the IP core where the master module is located; and/or, sends the message information learning result to a corresponding slave module, so that the corresponding slave module updates, according to the message information learning result, the message processing information table of the IP core where the slave module is located, wherein the slave module is a second processing module among all second processing modules except the master module | ⟵ 203 |

INFORMATION PROCESSING METHOD, ETHERNET SWITCHING CHIP AND STORAGE MEDIUM

CROSS-REFERENCE TO RELATED APPLICATION

The present disclosure is a National Stage Filing of PCT International Application No. PCT/CN2020/113731 filed on Sep. 7, 2020, which is based on and claims the priority to Chinese Patent Application No. 202010075350.X, filed on Jan. 22, 2020, the entire contents of which are incorporated herein by reference.

TECHNICAL FIELD

The present disclosure relates to an Ethernet data exchange technology, and in particular to an information processing method, an Ethernet switching chip, and a storage medium.

BACKGROUND

With the development of technologies such as ultra-large-scale cloud networks, storage networks, and High Performance Computing (HPC), the data interaction volume on the network is greater and greater, and the data processing capability of a single chip is also continuously improved from an order of magnitude of Giga Bits Per Second (Gbps) to an order of magnitude of Tera Bits Per Second (Tbps). However, the size of a single chip manufactured by the current production process is 14 nm/12 nm or 7 nm/6 nm, and an Intellectual Property core (IP core) of a single chip can run at a clock frequency up to 1.05 GHz or 1.7 GHz, respectively. A single chip with only one IP core cannot meet the requirements for a message processing bandwidth of up to 25.6 Tbps in the chip market. From the perspective of manufacturing engineering, in order to meet the requirements for the message processing bandwidth in the chip market, when the clock frequency of a single chip with a single IP core is limited, it is very necessary to design a single chip with dual IP cores or a plurality of IP cores.

However, in related arts, it is still necessary to optimize an information processing method of a single chip with dual cores or a plurality of cores.

SUMMARY

In view of this, embodiments of the present disclosure provide an information processing method, an Ethernet switching chip, and a storage medium.

The technical solutions of the embodiments of the present disclosure are implemented as follows.

The embodiments of the present disclosure provide an information processing method, including:
receiving, by a master module of an Ethernet switching chip, a message information learning request, wherein the Ethernet switching chip contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; and the master module is a second processing module among all second processing modules;

executing, by the master module in response to the received message information learning request, a self-learning operation corresponding to the message information learning request, so as to obtain a message information learning result; and updating, by the master module according to the message information learning result, the message processing information table of the IP core where the master module is located; and/or, sending, by the master module, the message information learning result to a corresponding slave module, so that the corresponding slave module updates, according to the message information learning result, the message processing information table of the IP core where the slave module is located, wherein the slave module is a second processing module among all second processing modules except the master module.

In the above solution, receiving, by the master module of the Ethernet switching chip, the message information learning request includes:
receiving, by the master module, the message information learning request sent by the first processing module of the IP core where the master module is located;
or,
receiving, by the master module, the message information learning request sent by the slave module, wherein the message information learning request sent by the slave module is received by the first processing module of the IP core where the slave module is located.

In the above solution, the method further includes:
querying, by the first processing module from the message processing information table of the IP core where the first processing module is located, a message processing strategy corresponding to the received message, so as to perform corresponding processing on the received message according to the found message processing strategy, wherein
the first processing module sends the message information learning request to the second processing module of the IP core where the first processing module is located in a case where one of following conditions is met:
the first processing module does not find, from the message processing information table of the IP core where the first processing module is located, the message processing strategy corresponding to the received message; or
the first processing module fails to perform corresponding processing on the received message according to the found message processing strategy.

In the above solution, when the message processing information table is updated, a corresponding module adds a message processing strategy corresponding to the message information learning result into the message processing information table of the IP core where the corresponding module is located; or, the corresponding module modifies, according to the message processing strategy corresponding to the message information learning result, a corresponding message processing strategy in the message processing information table of the IP core where the corresponding module is located.

In the above solution, sending, by the master module, the message information learning result to the corresponding slave module includes:
sending, by the master module, the message information learning result to the corresponding slave module via a first interface provided on the IP core where the master module is located, and a second interface provided on the IP core where the corresponding slave module is located.

In the above solution, the method further includes:

sending, by the second processing module, an updating request to the first processing module of the IP core where the second processing module is located, so that the first processing module updates, according to the updating request, the message processing information table of the IP core where the first processing module is located, wherein the updating request at least contains the message information learning result.

In the above solution, the method further includes:

starting to update, by the master module, after a preset time delay and according to the message information learning result, the message processing information table of the IP core where the master module is located, wherein the preset time delay is a difference value between a first moment and a second moment; the first moment is a moment when the master module sends the message information learning result to the corresponding slave module; and the second moment is a moment when the corresponding slave module receives the message information learning result.

The embodiments of the present disclosure further provide an Ethernet switching chip. The Ethernet switching chip contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; a second processing module among all second processing modules is a master module; the second processing modules among all second processing modules except the master module are slave modules, wherein the master module is configured to:
receive a message information learning request;
in response to the received message information learning request, execute a self-learning operation corresponding to the message information learning request, so as to obtain a message information learning result; and
update, according to the message information learning result, the message processing information table of the IP core where the master module is located; and/or, send the message information learning result to a corresponding slave module, so that the corresponding slave module updates, according to the message information learning result, the message processing information table of the IP core where the slave module is located.

The embodiments of the present disclosure further provide an Ethernet switching chip, including: a processor, and a memory configured to store a computer program executable on the processor, wherein the processor is configured to execute the operations of any one of the above methods when running the computer program.

The embodiments of the present disclosure further provide a storage medium, wherein a computer program is stored in the medium, and when executed by a processor, the computer program implements the operations of any one of the above methods.

In the technical solutions provided by the embodiments of the present disclosure, the master module of the Ethernet switching chip receives the message information learning request, wherein the Ethernet switching chip contains at least two IP cores; each IP core at least contains the first processing module and the second processing module; the first processing module is configured to perform corresponding processing on the received message according to the message processing information table stored in the IP core where the first processing module is located; the second processing module is configured to update the message processing information table; the master module is a second processing module among all second processing modules; in response to the received message information learning request, the master module executes the self-learning operation corresponding to the message information learning request, so as to obtain the message information learning result; according to the message information learning result, the master module updates the message processing information table of the IP core where the master module is located; and/or, sends the message information learning result to the corresponding slave module, so that the corresponding slave module updates, according to the message information learning result, the message processing information table of the IP core where the slave module is located, wherein the slave module is a second processing module among all second processing modules except the master module. In the solutions of the embodiments of the present disclosure, the message processing information tables of the at least two IP cores of the Ethernet switching chip are updated based on the message information learning result of the master module. In this way, the operations of the IP cores in a dual-core or multi-core Ethernet switching chip generate no conflict, which further enables external system behaviors of the dual-core or multi-core Ethernet switching chip to be the same as those of a single-core Ethernet switching chip.

BRIEF DESCRIPTION OF THE DRAWINGS

FIG. 1 is a schematic structural diagram of a dual-core Ethernet switching chip;

FIG. 2 is a schematic flowchart of an information processing method according to an embodiment of the present disclosure;

DETAILED DESCRIPTION OF THE EMBODIMENTS

Figure 3:
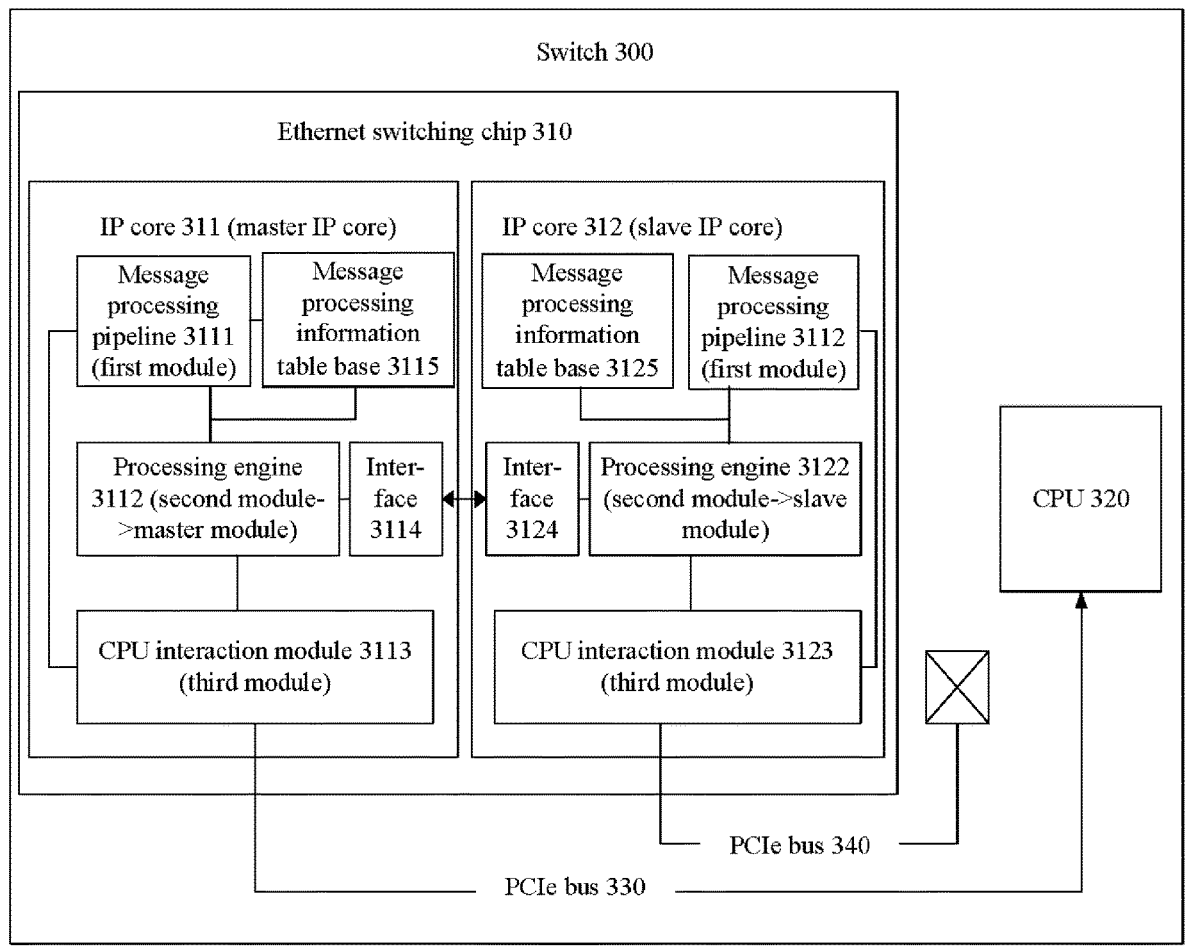
FIG. 3 is a schematic structural diagram of a switch according to an application embodiment of the present disclosure.

The technical solutions of the present disclosure will be described in further detail below in conjunction with the drawings and embodiments.

With the advancement of chip production process, the cost of Tape out is getting higher and higher. In order to enrich product lines on the premise of saving the cost, it is necessary to design and produce high-bandwidth (single-core) and ultrahigh-bandwidth (dual-core or multi-core) Ethernet switching chips in one Tape out. Since one IP core may be packaged on each Die, by using a Die to Die (D2D) technology, one Tape out may cover a plurality of product lines: a single-core Ethernet switching chip is packaged by one Die; and a dual-core or multi-core Ethernet switching chip is packaged by two or more Dies. Herein, in order to support that various IP cores contained in the dual-core or multi-core Ethernet switching chip may be separated and packaged into two or more different Ethernet switching chips which work independently, and may also be combined and packaged into one chip, the structures of the various IP cores are exactly the same. With regard to the dual-core or multi-core Ethernet switching chip, from the application perspective of the chip, a system behavior displayed by the chip at work should not make other terminals or servers perceive whether the chip architecture is a single-core or dual-core or multi-core design (for example, the other terminals or servers perceive that messages forwarded by the IP cores of the chip are conflicting or have inconsistent time delays). Therefore, information synchronization among the IP cores is very necessary. Specifically, when processing a message, the Ethernet switching chip needs to maintain a message processing information table (i.e., update the message processing information table stored in the IP core). The message processing information table is stored in the IP core, so that the IP core queries a message processing strategy corresponding to the received message, and performs corresponding processing (for example, forwarding, discarding, and so on) on the received message by using the found message processing strategy. For the IP core of a single-core Ethernet switching chip, the message processing information table is a public resource, that is, after receiving the message, all interfaces of the IP core query the same message processing information table when querying a message forwarding strategy corresponding to the received message, and the IP core may maintain the message processing information table stored by the IP core. However, for each IP core in at least two IP cores of a dual-core or multi-core Ethernet switching chip, the IP core not only stores message processing information tables that are strongly related to the interface of the IP core, such as an interface attribute information table, but also stores message processing information tables that are weakly related to the interface of the IP core, such as an Ethernet layer-2 bridge message Forward Database (FDB). Herein, the message processing information tables that are strongly related to the interface of the IP core are only stored in a corresponding IP core, and the message processing information tables that are weakly related to the interface of the IP core are stored in each IP core. Therefore, the message processing information tables that are strongly related to the interface of the IP core may be internally maintained by the corresponding IP core without informing other IP cores; and the message processing information tables that are weakly related to the interface of the IP core need to be maintained synchronously by all IP cores. The message processing information tables, which are stored in the IP cores and need to be maintained synchronously, should be consistent. However, since the Ethernet switching chip is produced by one Tape out covering a plurality of product lines, the IP cores are individually packaged, that is, there is no shared common resource area between the IP cores to support an inter-operation that is performed for synchronously maintaining the message processing information tables.

Taking the dual-core Ethernet switching chip shown in FIG. 1 as an example, an Ethernet switching chip 100 contains an IP core 110 and an IP core 120. A message processing pipeline 111 and a message processing pipeline 121 are configured to perform corresponding processing on received messages according to message processing information tables stored in the IP cores where the message processing pipelines 111 and 121 are located. A processing engine 112 and a processing engine 122 are configured to update the message processing information tables of the IP cores where the processing engines 112 and 122 are located (in practical applications, the message processing information tables may also be updated by the message processing pipelines or a Central Processing Unit (CPU) of a switch that is provided with the Ethernet switching chip, and an illustration is only given herein for the case in which the processing engines update the message processing information tables). When the Ethernet switching chip 100 needs to forward an Ethernet layer-2 message, in a case where the Ethernet switching chip 100 only contains the IP core 110, the message processing pipeline 111 will query, in the FDB stored in the IP core 110, a message forwarding strategy of a to-be-forwarded message. In a case where the message processing pipeline 111 does not find the message forwarding strategy of the to-be-forwarded message in the FDB, then the message processing pipeline 111 sends a message information learning request of the to-be-forwarded message to the processing engine 112, so as to trigger a self-learning operation of the processing engine 112, so that the processing engine 112 obtains a message information learning result of the to-be-forwarded message; the processing engine 112 determines the message forwarding strategy of the to-be-forwarded message based on the obtained message information learning result, and adds the message forwarding strategy into the FDB of the IP core 110, so that the message processing pipeline 111 subsequently performs forwarding processing on other received messages. However, the Ethernet switching chip 100 further contains the IP core 120. Since the FDB is a message processing information table that needs to be synchronously maintained by the IP core 110 and the IP core 120, the processing engine 112 determines the forwarding strategy of the to-be-forwarded message based on the obtained message information learning result, and adds the forwarding strategy into the FDB stored in the IP core 110, and meanwhile, the processing engine 112 also needs to send the obtained message information learning result to the processing engine 122, so that the processing engine 122 adds the corresponding message forwarding strategy into the FDB stored in the IP core 120. At this time, if the processing engine 122 of the IP core 120 receives the message information learning request of the message processing pipeline 121 and performs a self-learning operation, it is also needed to add the determined forwarding strategy of another to-be-forwarded message into the message processing pipeline 121, and the message processing pipeline 121 needs to update the FDB twice at the same time, and the two updates may be conflicting (for example, when the FDB is stored in a Hash manner, the forwarding strategy writing locations of the two to-be-forwarded messages of the FDB of the message processing pipeline 121 may be conflicting).

Based on this, in various embodiments of the present disclosure, the processing engine of an IP core of the Ethernet switching chip is set to be a master module, and the processing engines of other IP cores are set to be slave modules. The master module completes the self-learning operations triggered by the message processing pipelines of all IP cores, so as to obtain message information learning results, and the message processing information tables of at least two IP cores of the Ethernet switching chip are updated based on the message information learning results of the master module. In this way, the self-learning operations of the IP cores in the dual-core or multi-core Ethernet switching chip generate no conflict, which further enables external system behaviors of the dual-core or multi-core Ethernet switching chip to be the same as those of the single-core Ethernet switching chip.

The embodiments of the present disclosure provide an information processing method. As shown in FIG. 2, the method includes the following operations.

At operation 201, a master module of an Ethernet switching chip receives a message information learning request.

Herein, the Ethernet switching chip contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; and the master module is a second processing module among all second processing modules.

At operation 202, in response to the received message information learning request, the master module executes a self-learning operation corresponding to the message information learning request, so as to obtain a message information learning result.

At operation 203, according to the message information learning result, the master module updates the message processing information table of the IP core where the master module is located; and/or, sends the message information learning result to a corresponding slave module, so that the corresponding slave module updates, according to the message information learning result, the message processing information table of the IP core where the slave module is located.

Herein, the slave module is a second processing module among all second processing modules except the master module.

In the operation 201, in practical applications, the first processing module may be the message processing pipeline 111 and the message processing pipeline 121 of the Ethernet switching chip as shown in FIG. 1; and the second processing module may be the processing engine 112 and the processing engine 122 of the Ethernet switching chip as shown in FIG. 1.

In practical applications, before the master module receives the message processing request, the master module needs to be determined from all second processing modules.

Based on this, in an embodiment, the method may further include:

configuring the second processing module of an IP core of the Ethernet switching chip to be a master module, and configuring one or more second processing modules of one or more other IP cores to be one or more slave modules, so as to obtain a master module and at least one slave module.

In practical applications, a user may configure the second processing module of any IP core of the Ethernet switching chip to be the master module as needed; and the IP core where the master module is located may be determined to be a master IP core, and the IP core where the slave module is located may be determined to be a slave IP core.

In practical applications, for each IP core of the Ethernet switching chip, the corresponding IP core may further include a third processing module. After the second processing module of an IP core of the Ethernet switching chip is configured to be the master module, that is, after the master IP core is determined, the third processing module of the master IP core is configured to, via a Peripheral Component Interconnect express (PCIe) bus, perform information interaction with the CPU of the switch that is provided with the Ethernet switching chip. After the user redetermines the master module, the PCIe bus between the third processing module of an original master IP core and the CPU may be disconnected, and the third processing module of a redetermined new master IP core is connected to the CPU via the PCIe bus.

In practical applications, a message processing strategy is stored in the message processing information table. The first processing module may query, in the message processing information table of the IP core where the first processing module is located, the message processing strategy corresponding to the received message, so as to perform corresponding processing on the received message according to the found message processing strategy, for example, forwarding processing, discarding processing, or modifying a message priority field, and so on. The message processing information table stored in each IP core may be a message processing information table (which is referred to as a dedicated information table in subsequent descriptions) that is strongly related to the interface of the corresponding IP core, and may also be a message processing information table (which is referred to as a global information table in subsequent descriptions) that is weakly related to the interface of the corresponding IP core. Specifically, the dedicated information table is used for storing the message processing strategy associated with an IP core of the Ethernet switching chip, and is only stored in the corresponding IP core. For example, the dedicated information table may include an interface attribute information table, wherein an index ID contained in the interface attribute information table is an interface ID, and a specified interface for sure belong to a fixed IP core. The global information table is used for storing the message processing strategies associated with all IP cores of the Ethernet switching chip, and is stored in each IP core of the Ethernet switching chip. For example, the global information table may include message forwarding information tables such as an FDB, an Ethernet layer-3 Routing Information Base (RIB), a Multi-Protocol Label Switching (MPLS), and an Incoming Label Map (ILM), As another example, the global information table may include public resource information tables such as a time synchronization counter information table and a bandwidth evaluation information table, or state message processing information tables such as an Aging State Table (AST) corresponding to the FDB. The global information table needs to be maintained synchronously by all IP cores, that is, the global information tables stored in each IP core need to be maintained consistent. In this way, no matter which interface of the Ethernet switching chip receives a message, the corresponding IP core queries the same global information table when querying the message processing strategy corresponding to the received message.

In practical applications, when failing to perform corresponding processing on the received message according to the message processing information table, the first processing module of the IP core where the master module is located (i.e., the first processing module of the master IP core) may send the message information learning request to the master module, so as to trigger the self-learning operation of the master module; when failing to perform corresponding processing on the received message according to the message processing information table, the first processing module of the IP core where each slave module is located (i.e., the first processing module of each slave IP core) may send the message information learning request to the slave module of the IP core where the first processing module is located, and then each slave module sends the message information learning request to the master module, so as to trigger the self-learning operation of the master module. In this way, the master module completes the self-learning operations triggered by all IP cores to obtain message information learning results, and the message processing information tables of the IP cores are updated based on the message information learning results of the master module. In this way, the self-learning operations of the IP cores in the dual-core or multi-core Ethernet switching chip generate no conflict, which further enables external system behaviors of the dual-core or multi-core Ethernet switching chip to be the same as those of the single-core Ethernet switching chip.

Based on this, in an embodiment, the method may further include:

querying, by the first processing module from the message processing information table of the IP core where the first processing module is located, a message processing strategy corresponding to the received message, so as to perform corresponding processing on the received message according to the found message processing strategy.

In a case where one of the following conditions is met, the first processing module may send the message information learning request to the second processing module of the IP core where the first processing module is located:

the first processing module does not find, from the message processing information table of the IP core where the first processing module is located, the message processing strategy corresponding to the received message; or the first processing module fails to perform corresponding processing on the received message according to the found message processing strategy.

Correspondingly, receiving, by the master module of the Ethernet switching chip, the message information learning request includes:

receiving, by the master module, the message information learning request sent by the first processing module of the IP core where the master module is located; or, receiving, by the master module, the message information learning request sent by the slave module, wherein the message information learning request sent by the slave module is received by the first processing module of the IP core where the slave module is located.

In the operation 202, in practical applications, the self-learning operation corresponding to the message information learning request may be the self-learning operation of information such as a source IP address, a source port, a destination IP address, a destination port, and a transport layer protocol. Correspondingly, the message information learning result may include information obtained by the master IP core through the self-learning operation, such as the source IP address, the source port, the destination IP address, the destination port and the transport layer protocol, and a storage location of the corresponding information in the message processing information table.

In the operation 203, in practical applications, when the master module receives the message information learning request sent by the first processing module of the IP core where the master module is located, the master module may judge, according to a first preset strategy (the user may configure the first preset strategy in system software of the switch that is provided with the Ethernet switching chip as needed), whether the message processing information table corresponding to the massage information learning request is the dedicated information table of the master IP core or the global information table that is synchronously maintained by the IP cores. In a case where the master module determines that the message processing information table corresponding to the massage information learning request is the dedicated information table of the master IP core, the master module may update, according to the massage information learning result, the dedicated information table of the IP core where the master module is located. In a case where the master module determines that the message processing information table corresponding to the massage information learning request is the global information table that is synchronously maintained by the IP cores, in addition to updating, according to the massage information learning result, the global information table of the IP core where the master module is located, the master module also needs to send the massage information learning result to each slave module of the Ethernet switching chip, so that each slave module updates, according to the massage information learning result, the global information table of the IP core where the slave module is located. That is to say, in a case where the master module determines that the message processing information table corresponding to the massage information learning request is the global information table that is synchronously maintained by the IP cores, then each slave module of the Ethernet switching chip is the corresponding slave module. When the master module receives the massage information learning request sent by the slave module, the master module may also judge the massage information learning request according to the first preset strategy, so as to determine whether the message processing information table corresponding to the massage information learning request is the dedicated information table of a certain slave IP core (which is referred to as a target slave IP core in the subsequent descriptions) or the global information table that is synchronously maintained by the IP cores. In a case where the master module determines that the message processing information table corresponding to the massage information learning request is the dedicated information table of the target slave IP core, the master module may send the massage information learning result to the slave module of the target slave IP core, so that the slave module of the target slave IP core updates, according to the massage information learning result, the dedicated information table of the IP core where the slave module is located. In a case where the master module determines that the message processing information table corresponding to the massage information learning request is the global information table that is synchronously maintained by the IP cores, the master module may update, according to the massage information learning result, the global information table of the IP core where the master module is located, and meanwhile send the massage information learning result to each slave module of the Ethernet switching chip, so that each slave module updates, according to the massage information learning result, the global information table of the IP core where the slave module is located.

In practical applications, for each IP core of the Ethernet switching chip, the second processing module may directly update, according to the message information learning result, the message processing information table of the IP core where the second processing module is located. The second processing module may also send, to the first processing module of the IP core where the second processing module is located, an updating request containing the message information learning result, so that the first processing module updates, according to the updating request, the message processing information table of the IP core where the first processing module is located. The user may select the above two manners according to chip design requirements.

Based on this, in an embodiment, the method may further include:

sending, by the second processing module, an updating request to the first processing module of the IP core where the second processing module is located, so that the first processing module updates, according to the updating request, the message processing information table of the IP core where the first processing module is located, wherein the updating request at least contains the message information learning result.

In practical applications, in order to optimize the message processing performance of the Ethernet switching chip, for the global information table that needs to be synchronously maintained at the IP cores, the IP cores need to synchronously update their respective global information tables.

Based on this, in an embodiment, in a case where the master module updates, according to the massage information learning result, the message processing information table of the IP core where the master module is located, and sends the message information learning result to the corresponding slave module, so that the corresponding slave module updates, according to the massage information learning result, the message processing information table of the IP core where the corresponding slave module is located, the method may further include:

the master module starts to update, after a preset time delay and according to the message information learning result, the message processing information table of the IP core where the master module is located, wherein the preset time delay is a difference value between a first moment and a second moment; the first moment is a moment when the master module sends the message information learning result to the corresponding slave module; and the second moment is a moment when the corresponding slave module receives the message information learning result.

In practical applications, the user may configure a pipeline of a preset number of stages in the second processing module each IP core, and the pipeline of the preset number of stages is configured to implement the preset time delay. Specifically, when the second processing module is configured to be the master module, and the master module needs to update, according to the message information learning result, the global information table of the IP core where the master module is located, the master module may update, via the pipeline of the preset number of stages, the global information table of the IP core where the master module is located, that is, start to update the global information table of the IP core where the master module after the preset time delay. When the second processing module is configured to be the slave module, and the slave module needs to receive the message information learning result sent by the master module, so as to update the global information table of the IP core where the slave module is located, the slave module may skip the pipeline of the preset number of stages configured by the slave module, and directly update the global information table of the IP core where the slave module is located. Here, the user may determine the size of the preset time delay based on the chip design requirements, for example, the user may set the preset number of stages of the pipeline configured for each second processing module to be 2, that is, each second processing module is configured with a two-stage pipeline, then the preset time delay may be determined to be 2 clock periods, and the clock period is a clock period of a clock module of the Ethernet switching chip. That is to say, after the two clock periods, the master module starts to update, according to the message information learning result, the global information table of the IP core where the master module is located, and at the same time, the master module also requires two clock periods to send the message information learning result to the corresponding slave module, that is, the corresponding slave module receives the message information learning result after the two clock periods and directly starts to update the global information table of the IP core where the corresponding slave module is located. In this way, the IP cores may synchronously update their respective global information tables.

In practical applications, in order to optimize the message processing performance of the Ethernet switching chip, the Ethernet switching chip needs to complete the update of the message processing information table of each IP core within a reasonable time range, that is, a time length required by the corresponding slave module for receiving the message information learning result sent by the master module should be within a reasonable time range (for example, 20 clock periods). The user may determine, based on the chip design requirements, the time length required by the corresponding slave module for receiving the message information learning result sent by the master module, and set the time length by controlling the length of a data transmission line between the modules, or in other ways.

In practical applications, in the process of updating the message processing information table, a corresponding module (i.e., the master module and/or the slave module) may add the message processing strategy corresponding to the message information learning result into the message processing information table of the IP core where the corresponding module is located; or, the corresponding module may modify, according to the message processing strategy corresponding to the message information learning result, a corresponding message processing strategy in the message processing information table of the IP core where the corresponding module is located. Specifically, in a case where the master module receives the message information learning request sent by the corresponding first processing module in the case of failing to query, from the message processing information table of the IP core where the first processing module is located, the message processing strategy corresponding to the received message, the corresponding module may add the message processing strategy corresponding to the message information learning result into the message processing information table of the IP core where the corresponding module is located; and in a case where the master module receives the message information learning request sent by the corresponding first processing module in the case of failing to perform corresponding processing on the received message according to the found message processing strategy, the corresponding module may modify, according to the message processing strategy corresponding to the message information learning result, a corresponding message processing strategy in the message processing information table of the IP core where the corresponding module is located.

In practical applications, each IP core of the Ethernet switching chip needs to be provided with a communication interface between the IP cores, so that the master module and each slave module can perform information interaction via the communication interface.

Based on this, in an embodiment, sending, by the master module, the message information learning result to the corresponding slave module includes:

sending, by the master module, the message information learning result to the corresponding slave module via a first interface provided on the IP core where the master module is located, and a second interface provided on the IP core where the corresponding slave module is located.

In practical applications, in order to ensure the working efficiency of the Ethernet switching chip, the user may set the number of information interactions supported by the first interface and the second interface within each clock period as needed. For example, within each clock period, the first interface is able to transmit, to the corresponding slave module, a copy of information sent by the master module, and receive a copy of information sent by the corresponding slave module; and within each clock period, the second interface is able to transmit, to the master module, a copy of information sent by the corresponding slave module, and receive a copy of information sent by the master module.

In practical applications, according to the size of the information that the master module and each slave module need to transmit during information interaction, the user may set a maximum data volume, which the first interface and the second interface allow to pass, to be nbit, wherein n is a positive integer.

In practical applications, in order to ensure the correct rate of message forwarding of the Ethernet switching chip, an Error Correcting Code (ECC) technology or other error correcting technologies may be used to make the information interaction between the first interface and the second interface be error-free communication.

In practical applications, for each IP core of the Ethernet switch chip, considering that a certain time delay is required by the second processing module for receiving the message information learning request from the first processing module, the message processing information table of the IP core where the second processing module is located may has been updated within this period of time delay, that is, it is not necessary to perform the self-learning operation corresponding to the message information learning request again. In order to determine whether it is necessary to perform the self-learning operation corresponding to the received message information learning request, after receiving the message information learning request from the first processing module, the second processing module may query the message processing information table of the IP core where the second processing module is located, so as to determine whether the message processing strategy corresponding to the information learning request has been updated; in a case where the message processing strategy corresponding to the information learning request has been updated, the second processing module ends the current process (that is, in a case where the second processing module is the master module, the second processing module stops executing the self-learning operation corresponding to the message information learning request; and in a case where the second processing module is the slave module, the second processing module does not send the message information learning request to the master module); and in a case where the message processing strategy corresponding to the information learning request has been updated, the second processing module continues to execute the next operation (in a case where the second processing module is the master module, the second processing module executes the self-learning operation corresponding to the message information learning request; and in a case where the second processing module is the slave module, the second processing module sends the message information learning request to the master module).

In the information processing method provided by the embodiments of the present disclosure, the master module of the Ethernet switching chip receives the message information learning request, wherein the Ethernet switching chip contains at least two IP cores; each IP core at least contains the first processing module and the second processing module; the first processing module is configured to perform corresponding processing on the received message according to the message processing information table stored in the IP core where the first processing module is located; the second processing module is configured to update the message processing information table; the master module is a second processing module among all second processing modules; in response to the received message information learning request, the master module executes the self-learning operation corresponding to the message information learning request, so as to obtain the message information learning result; the master module, updates, according to the message information learning result, the message processing information table of the IP core where the master module is located; and/or, sends the message information learning result to the corresponding slave module, so that the corresponding slave module updates, according to the message information learning result, the message processing information table of the IP core where the slave module is located, wherein the slave module is a second processing module among all second processing modules except the master module. Therefore, the operations of the IP cores in the dual-core or multi-core Ethernet switching chip generate no conflict, which further enables external system behaviors of the dual-core or multi-core Ethernet switching chip to be the same as those of the single-core Ethernet switching chip.

The present disclosure will be described in further detail below in conjunction with an application embodiment.

In the present application embodiment, as shown in FIG. 3, a switch 300 includes a dual-core Ethernet switching chip 310 and a CPU 320. The Ethernet switching chip 310 includes an IP core 311 and an IP core 312. Each IP core includes a message processing pipeline (i.e., the above first processing module, which may be referred to as a first module), a processing engine (i.e., the above second processing module, which may be referred to as a second module), and a CPU interaction module (i.e., the above third processing module, which may be referred to as a third module), an interface (i.e., the above first interface or second interface), and a message processing information table base; that is, the IP core 311 includes a first module 3111, a second module 3112, a third module 3113, an interface 3114 and a message processing information table base 3115; and the IP core 312 includes a first module 3121, a second module 3122, a third module 3123, an interface 3124 and a message processing information table base 3125.

The first module 3111 and the first module 3121 are configured to perform corresponding processing on received messages according to message processing information tables of the IP cores where the first module 3111 and the first module 3121 are located.

The second module 3112 and the second module 3122 are configured to update the message processing information tables of the IP cores where the second module 3112 and the second module 3122 are located. The update includes adding a message processing strategy, modifying the message processing strategy and deleting the message processing strategy.

The third module 3113 and the third module 3123 are configured to perform information interaction with the CPU 320 via a PCIe bus 330 or a PCIe bus 340.

The interface 3114 and the interface 3124 are configured to implement the information interaction between the second modules, that is, implement the information interaction between the IP cores.

The message processing information table base 3115 and the message processing information table base 3125 are configured to store the message processing information tables of the IP cores where the message processing information table base 3115 and the message processing information table base 3125 are located.

In practical applications, the first module 3111 or the first module 3121 or the CPU 320 may also initiate the update of the message processing information table.

In the present application embodiment, the second module 3112 is a master module, and the second module 3122 is a slave module. Correspondingly, the IP core 311 is a master IP core, and the IP core 312 is a slave IP core. The IP core 311 performs information interaction with the CPU 320 via the PCIe bus 330, and the PCIe bus 340 connected to the IP core 312 is not connected to the CPU 320. When the master module and the slave module need to be switched, that is, when the second module 3122 is configured to be the master module and the second module 3112 is configured to be the slave module, the connection between the PCIe bus 330 and the CPU 320 needs to be disconnected, and the PCIe bus 340 is connected to the CPU 320, so that the IP core 312 may act as the master IP core to perform information interaction with the CPU 320.

Herein, there is no substantial difference between "the IP core 311 performs information interaction with the CPU 320 via the PCIe bus 330, and the PCIe bus 340 connected to the IP core 312 is not connected to the CPU 320 (that is, the second module 3112 is the master module, the second module 3122 is the slave module, the IP core 311 is the master IP core, and the IP core 312 is the slave IP core)" and "the IP core 312 performs information interaction with the CPU 320 via the PCIe bus 340, and the PCIe bus 330 connected to the IP core 311 is not connected to the CPU 320 (that is, the second module 3122 is the master module, the second module 3112 is the slave module, the IP core 312 is the master IP core, and the IP core 311 is the slave IP core)". It is taken as an example for illustration in the present application embodiment that, "the IP core 311 performs information interaction with the CPU 320 via the PCIe bus 330, and the PCIe bus 340 connected to the IP core 312 is not connected to the CPU 320 (that is, the second module 3112 is the master module, the second module 3122 is the slave module, the IP core 311 is the master IP core, and the IP core 312 is the slave IP core)".

In addition, it should be noted that, the message processing information table in the present application embodiment is a global information table.

Based on the Ethernet switching chip 310, the information processing method in the present application embodiment includes two application scenarios: an application scenario in which the master IP core 311 triggers a learning request (i.e., the above message information learning request), and an application scenario in which the slave IP core 311 triggers the learning request. The operations of each application scenario will be described in detail in combination with the drawings.

The first application scenario is an application scenario in which the master IP core 311 triggers the learning request. The information processing method in the present application embodiment includes the following operations.

At operation 401, the first module 3111 receives a first message, and parses the first message to obtain a first source address; and then operation 402 is executed.

At operation 402, the first module 3111 sends a first query request to the message processing information table base 3115; the first query request contains the first source address; the first query request is used for acquiring a first receiving port corresponding to the first source address, so that the first module 3111 forwards the first message to the first receiving port; and then operation 403 is executed.

At operation 403, the message processing information table base 3115 receives the first query request, determines that there is no record corresponding to the first source address in the message processing information table of the message processing information table base 3115, and returns a first query result to the first module 3111; the first query result is used for informing the first module 3111 that there is no record corresponding to the first source address in the message processing information table; and then operation 404 is executed.

At operation 404, the first module 3111 receives the first query result, determines that there is no record corresponding to the first source address in the message processing information table base 3115, and sends a first learning request to the second module 3112; the first learning request contains the first source address; the first learning request is used for triggering a self-learning operation of the second module 3112, so as to determine the first receiving port corresponding to the first source address; and then operation 405 is executed.

At operation 405, the second module 3112 receives the first learning request, and sends a second query request to the message processing information table base 3115; the second query request contains the first source address; the second query request is used for confirming whether there is really no record corresponding to the first source address in the message processing information table base 3115; and then operation 406 is executed.

At operation 406, the message processing information table base 3115 receives the second query request, judges whether there is a record corresponding to the first source address in the message processing information table of the message processing information table base 3115, and returns a second query result to the second module 3112; the second query result is used for informing the second module 3112 whether there is a record corresponding to the first source address in the message processing information table.

At operation 407, the second module 3112 receives the second query result, and according to the second query result, determines whether there is a record corresponding to the first source address in the message processing information table base 3115; in a case where so, ends the current process; in a case where not, performs the self-learning operation, determines the first receiving port corresponding to the first source address, and obtains a first learning result that contains the first source address and the first receiving port; and then operation 408 and operation 409 are executed synchronously.

At operation 408, the second module 3112 sends, to the message processing information table base 3115, a first updating instruction containing the first learning result after X clock periods; and the first updating instruction is used for indicating the message processing information table base 3115 to write the first learning result into the message processing information table of the message processing information table base 3115.

Herein, X refers to the number of stages of the pipeline configured by the user for the second module 3112, and the second module 3112 may send, via the configured X-stage pipeline, the first updating instruction to the message processing information table base 3115 after the X clock periods; and the clock period is a clock period of a clock module contained in the Ethernet switch chip 310.

At operation 409, the second module 3112 sends the first learning result to the interface 3114; and then operation 410 is executed.

At operation 410, the interface 3114 sends the first learning result to the interface 3124; and then operation 411 is executed At operation 411, the interface 3124 sends the first learning result to the second module 3122; and then operation 412 is executed.

At operation 412, the second module 3122 sends, to the message processing information table base 3125, a second updating instruction containing the first learning result; and the second updating instruction is used for indicating the message processing information table base 3125 to write the first learning result into the message processing information table of the message processing information table base 3125.

Herein, it should be noted that the time required for executing operations 409 to 411 is the X clock periods, that is, the second module 3112 and the second module 3122 synchronously send the updating instructions to respective corresponding message processing information table bases, so that the message processing information table base 3115 and the message processing information table base 3125 write the first learning result at an equal time delay (writing the first learning result into their respective message processing information tables at the same time).

The second scenario is an application scenario in which the slave IP core 312 triggers the learning request.

Figure 5:
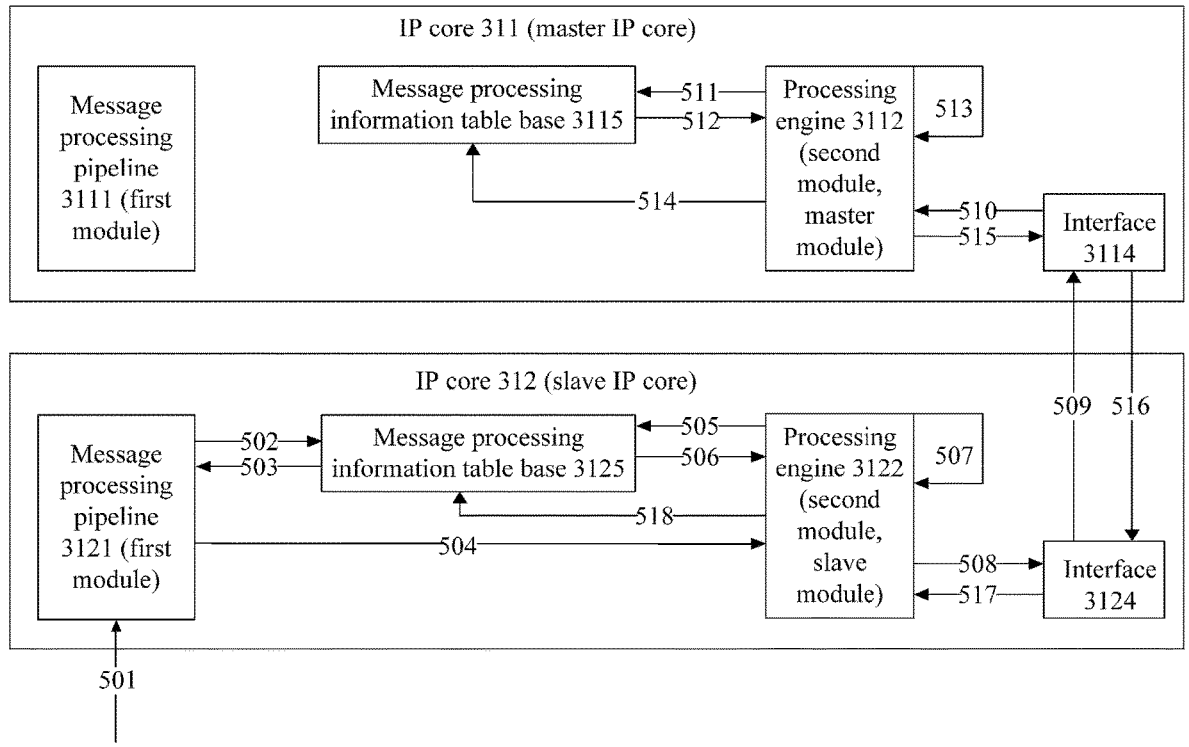
FIG. 5 is a schematic flowchart of an information processing method according to an application embodiment of the present disclosure in an application scenario in which a slave IP core triggers a learning request.

Specifically, as shown in FIG. 5, in the application scenario in which the slave IP core 312 triggers the learning request, the information processing method in the present application embodiment includes the following operations.

At operation 501, the first module 3121 receives a second message, and parses the second message to obtain a second source address; and then operation 502 is executed.

At operation 502, the first module 3121 sends a third query request to the message processing information table base 3125; the third query request contains the second source address; the third query request is used for acquiring a second receiving port corresponding to the second source address, so that the first module 3121 forwards the second message to the second receiving port; and then operation 503 is executed.

At operation 503, the message processing information table base 3125 receives the third query request, determines that there is no record corresponding to the second source address in the message processing information table of the message processing information table base 3125, and returns a third query result to the first module 3121; and the third query result is used for informing the first module 3121 that there is no record corresponding to the second source address in the message processing information table; and then operation 504 is executed.

At operation 504, the first module 3121 receives the third query result, determines that there is no record corresponding to the second source address in the message processing information table base 3125, and sends a second learning request to the second module 3122; the second learning request contains the second source address; the second learning request is used for triggering the self-learning operation of the master module (the second module 3112), so as to determine the second receiving port corresponding to the second source address; and then operation 505 is executed.

At operation 505, the second module 3122 receives the second learning request, and sends a fourth query request to the message processing information table base 3125; the fourth query request contains the second source address; the fourth query request is used for confirming whether there is really no record corresponding to the second source address in the processing information table base 3125; and then operation 506 is executed.

At operation 506, the message processing information table base 3125 receives the fourth query request, judges whether there is a record corresponding to the second source address in the message processing information table of the message processing information table base 3125, and returns a fourth query result to the second module 3122; and the fourth query result is used for informing the second module 3122 whether there is a record corresponding to the second source address in the message processing information table.

At operation 507, the second module 3122 receives the fourth query result, and according to the fourth query result, determines whether there is a record corresponding to the second source address in the message processing information table base 3125; if so, the current process is ended; and if not, operation 508 is executed.

At operation 508, the second module 3122 sends the second learning request to the interface 3124; and then operation 509 is executed.

At operation 509, the interface 3124 sends the second learning request to the interface 3114; and then operation 510 is executed.

At operation 510, interface 3114 sends the second learning request to the second module 3112; and then operation 511 is executed.

At operation 511, the second module 3112 receives the second learning request, and sends a fifth query request to the message processing information table base 3115; the fifth query request contains the second source address; the fifth query request is used for confirming whether there is a record corresponding to the second source address in the message processing information table base 3115; and then operation 512 is executed.

At operation 512, the message processing information table base 3115 receives the fifth query request, judges whether there is a record corresponding to the second source address in the message processing information table of the message processing information table base 3115, and returns a fifth query result to the second module 3112; and the fifth query result is used for informing the second module 3112 whether there is a record corresponding to the second source address in the message processing information table.

At operation 513, the second module 3112 receives the fifth query result, and according to the fifth query result, determines whether there is a record corresponding to the second source address in the message processing information table base 3115; if so, ends the current process; if not, performs the self-learning operation, determines the second receiving port corresponding to the second source address, and obtains a second learning result that contains the second source address and the second receiving port; and then operation 514 and operation 515 are executed synchronously.

At operation 514, the second module 3112 sends, to the message processing information table base 3115, a third updating instruction containing the second learning result after X clock periods; and the third updating instruction is used for indicating the message processing information table base 3115 to write the second learning result into the message processing information table of the message processing information table base 3115.

At operation 515, the second module 3112 sends the second learning result to the interface 3114; and then operation 516 is executed.

At operation 516, the interface 3114 sends the second learning result to the interface 3124; and then operation 517 is executed.

At operation 517, the interface 3124 sends the second learning result to the second module 3122; and then operation 518 is executed.

At operation 518, the second module 3122 sends, to the message processing information table base 3125, a fourth updating instruction containing the second learning result; and the fourth update instruction is used for indicating the message processing information table base 3125 to write the second learning result into the message processing information table of the message processing information table base 3125.

Herein, it should be noted that the time required for executing operations 515 to 517 is the X clock periods, that is, the second module 3112 and the second module 3122 synchronously send the updating instructions to respective corresponding message processing information table bases, so that the message processing information table base 3115 and the message processing information table base 3125 write the second learning result at an equal time delay (writing the second learning result into their respective message processing information tables at the same time).

Figure 4:
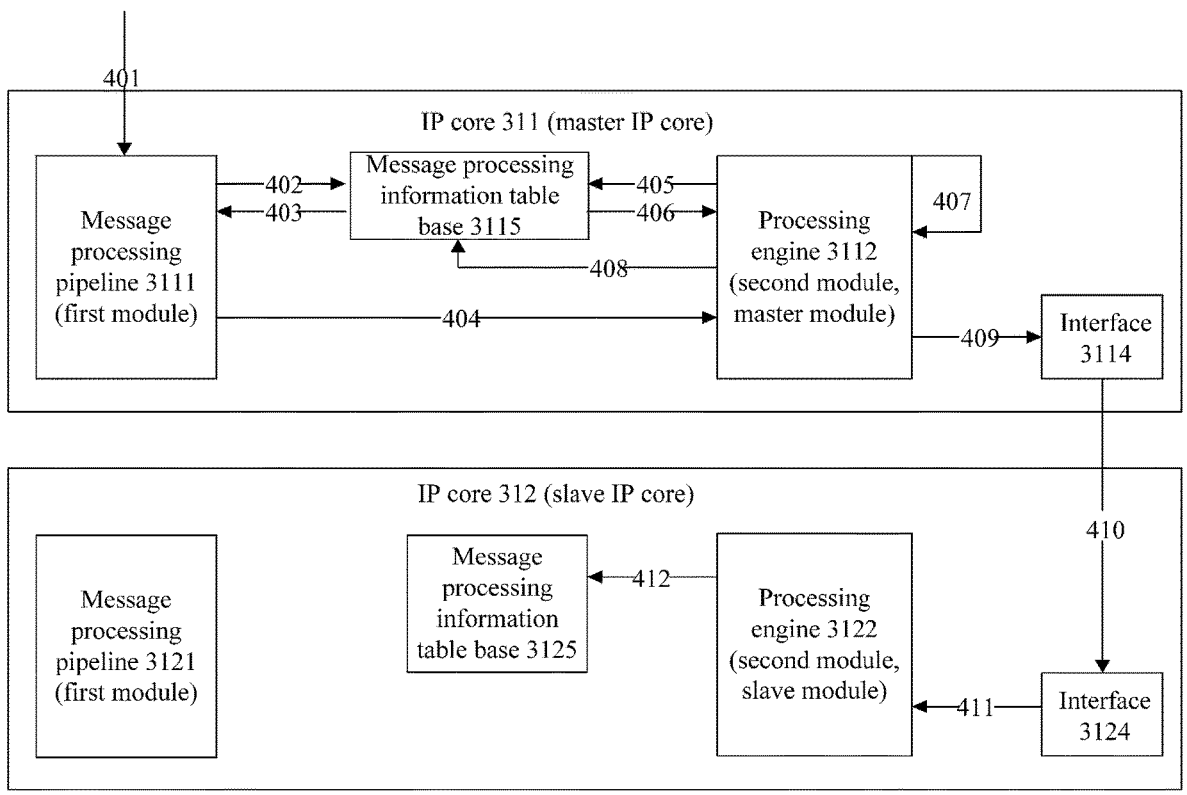
FIG. 4 is a schematic flowchart of an information processing method according to an application embodiment of the present disclosure in an application scenario in which a master IP core triggers a learning request.

In the present application embodiment, the self-learning operation for the source address is only taken as an illustration; and in practical applications, the self-learning operation may also be a self-learning operation for information such as a source port, a destination address, a destination port, and a transport layer protocol; and moreover, as shown in FIG. 3, FIG. 4 and FIG. 5, the setting locations of the IP core 311 and the IP core 312 and the setting positions of the various modules contained in the IP core 311 and the various modules contained in the IP core 312 are only shown as examples. In practical applications, the setting locations of the IP core 311 and the IP core 312 and the setting positions of the various modules contained in the IP core 311 and the various modules contained in the IP core 312 may be set by the user according to the chip design requirements. For example, the IP core 311 and the IP core 312 may be set symmetrically; and the various modules contained in the IP core 311 and the various modules contained in the IP core 312 may also be set symmetrically.

In addition, the specific implementation process of the information processing method provided by the present application embodiment is the same as the specific implementation process of the operations 201 to 203 in the information processing method shown in FIG. 2, and thus will not be repeated herein.

By means of the information processing method of the present application embodiment, an accelerated learning mechanism of the message processing information table in the dual-core or multi-core Ethernet switch chip is provided, the communication between the IP cores is implemented by using the inter-core communication interfaces provided on the IP cores, and state synchronization between the IP cores (that is, the synchronization of the global information tables) is also implemented. In this way, an inter-operation problem of two or more IP cores packaged on one Ethernet switch chip is solved, so that external system behaviors of the dual-core or multi-core Ethernet switch chip are the same as those of the single-core Ethernet switch chip, which further avoids the impact on network deployment caused by an inter-operation conflict between the two or more IP cores packaged on one Ethernet switch chip.

Figure 6:
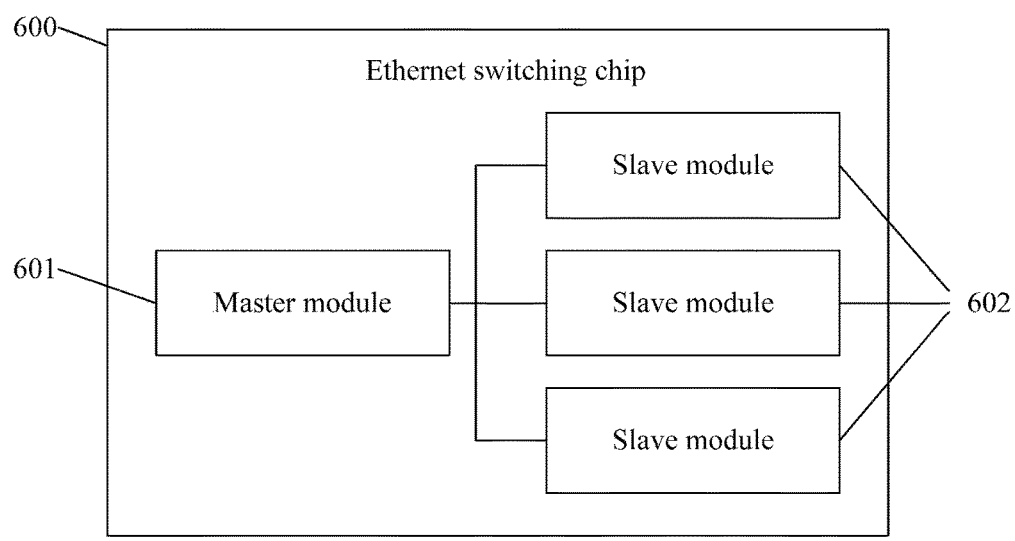
FIG. 6 is schematic structural diagram of an Ethernet switching chip according to an embodiment of the present disclosure.

In order to implement the method in the embodiments of the present disclosure, the embodiments of the present disclosure further provide an Ethernet switching chip. As shown in FIG. 6, an Ethernet switching chip 600 contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; a second processing module among all second processing modules is a master module 601; the second processing modules among all second processing modules except the master module are slave modules 602, wherein the master module 601 is configured to:
receive a message information learning request;
in response to the received message information learning request, execute a self-learning operation corresponding to the message information learning request, so as to obtain a message information learning result; and
update, according to the message information learning result, the message processing information table of the IP core where the master module is located; and/or, send the message information learning result to a corresponding slave module 602, so that the corresponding slave module 602 updates, according to the message information learning result, the message processing information table of the IP core where the slave module is located.

In an embodiment, the master module 601 is configured to:
receive the message information learning request sent by the first processing module of the IP core where the master module is located; or,
receive the message information learning result sent by the slave module 602, wherein the message information learning result sent by the slave module 602 is received by the first processing module of the IP core where the slave module is located.

In an embodiment, the first processing module is configured to:
query, from the message processing information table of the IP core where the first processing module is located, a message processing strategy corresponding to the received message, so as to perform corresponding processing on the received message according to the found message processing strategy, wherein the first processing module sends the message information learning request to the second processing module of the IP core where the first processing module is located in a case where one of following conditions is met:

not querying, from the message processing information table of the IP core where the first processing module is located, the message processing strategy corresponding to the received message; or failing to perform corresponding processing on the received message according to the found message processing strategy.

In an embodiment, when the message processing information table is updated, a corresponding module (i.e., the master module and/or the slave module) is configured to:

add the message processing strategy corresponding to the message information learning result into the message processing information table of the IP core where the corresponding module is located; or, modify, according to the message processing strategy corresponding to the message information learning result, a corresponding message processing strategy in the message processing information table of the IP core where the corresponding module is located.

In an embodiment, the master module 601 is configured to:

send the message information learning result to the corresponding slave module 602 via a first interface provided on the IP core where the master module is located, and a second interface provided on the IP core where the corresponding slave module 602 is located.

In an embodiment, the second processing module is configured to:

send an updating request to the first processing module of the IP core where the second processing module is located, so that the first processing module updates, according to the updating request, the message processing information table of the IP core where the first processing module is located, wherein the updating request at least contains the message information learning result.

In an embodiment, the master module 601 is configured to:

start to update, after a preset time delay and according to the message information learning result, the message processing information table of the IP core where the master module is located, wherein the preset time delay is a difference value between a first moment and a second moment; the first moment is a moment when the master module 601 sends the message information learning result to the corresponding slave module 602; and the second moment is a moment when the corresponding slave module 602 receives the message information learning result.

In practical applications, the master module 601 and the slave module 602 may be implemented by a processor in the Ethernet switching chip 600.

It should be noted that, various modules in the Ethernet switching chip 600 provided by the above embodiments are only illustrated by the division of the above program modules. In practical applications, the above processing may be allocated to different program modules for completion as needed, that is, an internal structure of an apparatus is divided into different program modules to complete all or part of the above processing. In addition, the Ethernet switching chip 600 provided by the above embodiments belongs to the same concept as the method embodiments. The specific implementation process thereof is detailed in the method embodiments, and thus will not be repeated herein.

Figure 7:
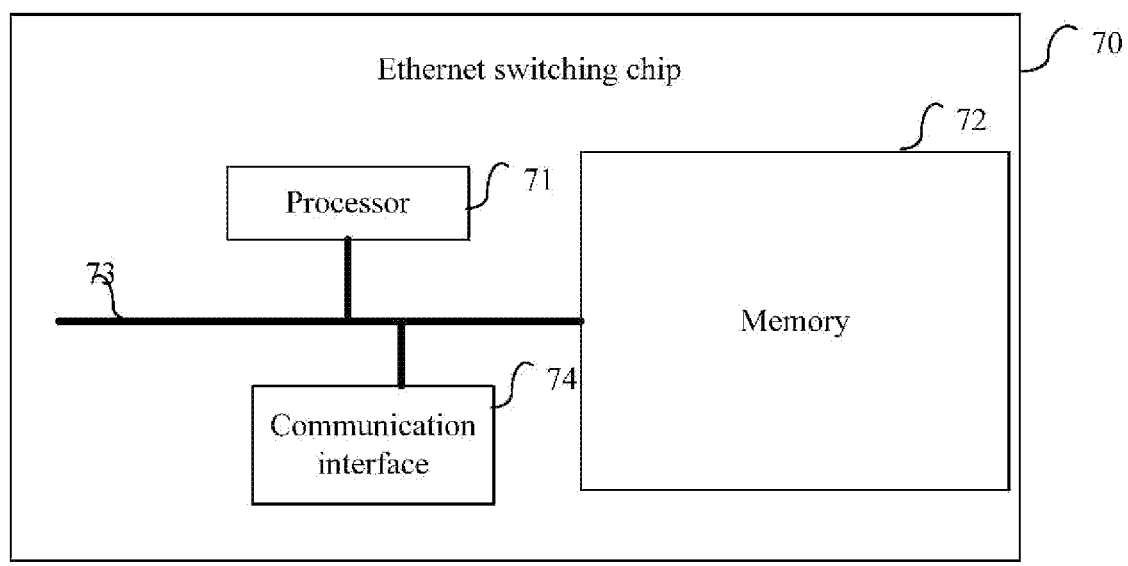
FIG. 7 is a schematic diagram of a hardware structure of an Ethernet switching chip according to an embodiment of the present disclosure.

Based on the hardware implementation of the above program modules, and in order to implement the method of the embodiments of the present disclosure, the embodiments of the present disclosure further provide an Ethernet switching chip. As shown in FIG. 7, an Ethernet switching chip 70 includes a memory 72, a processor 71, and a computer program, which is stored on the memory 72 and executable on the processor 71; and when executing the program, the processor 71 implements the method provided by one or more technical solutions described above.

Specifically, the master module of the Ethernet switching chip 70 executes the following operations by means of the processor 71: receiving a message information learning request; in response to the received message information learning request, executing a self-learning operation corresponding to the message information learning request, so as to obtain a message information learning result; and according to the message information learning result, updating the message processing information table of the IP core where the master module is located; and/or, sending, by the master module, the message information learning result to a corresponding slave module, so that the corresponding slave module updates, according to the message information learning result, the message processing information table of the IP core where the slave module is located, wherein the Ethernet switching chip 70 further contains at least two IP cores; each IP core at least contains a first processing module and a second processing module; the first processing module is configured to perform corresponding processing on a received message according to a message processing information table stored in the IP core where the first processing module is located; the second processing module is configured to update the message processing information table; the master module is a second processing module among all second processing modules, wherein the slave module is a second processing module among all second processing modules except the master module.

It should be noted that, for the specific process of the processor 71 for executing the operations, reference may be made to the method embodiments, which will not be repeated herein.

Of course, in practical applications, various components in the Ethernet switching chip 70 are coupled together by a bus system 73. It can be understood that, the bus system 73 is configured to implement connection communication between these components. In addition to a data bus, the bus system 73 further includes a power bus, a control bus and a state signal bus. But for the sake of clarity, in FIG. 7, various buses are marked as bus systems 73; and meanwhile, the Ethernet switching chip 70 may further include a communication interface 74, which is configured to perform information interaction with other devices.

The memory 72 in the embodiments of the present disclosure is configured to store various types of data, so as to support the operations of the Ethernet switching chip 70. Examples of these data include: any computer program for operating on the Ethernet switching chip 70.

The method disclosed in the above embodiments of the present disclosure may be applied to the processor 71, or implemented by the processor 71. The processor 71 may be an integrated circuit chip with signal processing capability. In an implementation process, each operation of the above method may be completed by a hardware integrated logic circuit or instructions in the form of software in the processor 71. The above processor 71 may be a general-purpose processor, a Digital Signal Processor (DSP), or other programmable logic devices, discrete gates or transistor logic devices, discrete hardware components, and the like. The processor 71 may implement or execute the methods, operations and logical block diagrams disclosed in the embodiments of the present disclosure. The general-purpose processor may be a microprocessor or any conventional processor, or the like. In conjunction with the operations of the method disclosed in the embodiments of the present disclosure, the solution may be directly embodied as being executed by a hardware decoding processor, or by a combination of hardware and software modules in the decoding processor. The software module may be located in a storage medium, the storage medium is located in the memory 72, and the processor 71 reads information in the memory 72, and completes the operations of the foregoing method in combination with its hardware.

In an exemplary embodiment, the Ethernet switching chip 70 may be implemented by one or more Application Specific Integrated Circuits (ASIC), a DSP, a Programmable Logic Device (PLD), a Complex Programmable Logic Device (CPLD), a Field-Programmable Gate Array (FPGA), a general-purpose processor, a controller, a Micro Controller Unit (MCU), a Microprocessor, or other electronic components, and is configured to execute the foregoing method.

It can be understood that, the memory (the memory 72) in the embodiments of the present disclosure may be a volatile memory or a non-volatile memory, and may also include both the volatile memory and the non-volatile memory, wherein the non-volatile memory may be a Read Only Memory (ROM), a Programmable Read-Only Memory (PROM), an Erasable Programmable Read-Only Memory (EPROM), an electrically erasable programmable read-only memory (EEPROM, Electrically Erasable Programmable Read-Only Memory), a ferromagnetic random access memory (FRAM, ferromagnetic random access memory), a flash memory (Flash Memory), a magnetic surface memory, a compact disc, or a Compact Disc Read-Only Memory (CD-ROM); and the magnetic surface memory may be a disk memory or a magnetic tape memory. The volatile memory may be a Random Access Memory (RAM), which is used as an external cache. By way of exemplary, but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memories described in the embodiments of the present disclosure are intended to include, but are not limited to, these and any other suitable types of memories.

In an exemplary embodiment, the embodiments of the present disclosure further provide a storage medium, that is, a computer storage medium, which is specifically a computer-readable storage medium, for example, including the memory 72 for storing a computer program, and the above computer program may be executed by the processor 71 of the Ethernet switching chip 70, so as to complete the operations described in the foregoing method. The computer-readable storage medium may be memories such as an FRAM, an ROM, a PROM, an EPROM, an EEPROM, a Flash Memory, a magnetic surface memory, an optical disk, or a CD-ROM.

It should be noted that "first", "second" and the like are used for distinguishing similar objects, but are not necessarily used for describing a specific sequence or order.

In addition, the technical solutions described in the embodiments of the present disclosure may be arbitrarily combined with each other, if there is no conflict.

The above descriptions are only preferred embodiments of the present disclosure, and are not intended to limit the protection scope of the present disclosure.

What is claimed is:

1. An information processing method, comprising:
receiving, by a master module of an Ethernet switching chip, a message information learning request, wherein the Ethernet switching chip contains at least two Intellectual Property (IP) cores; each IP core at least contains a first processing module and a second processing module; the first processing module is configured to perform corresponding processing on a received message according to a message processing information table stored in the IP core where the first processing module is located; the second processing module is configured to update the message processing information table; and the master module is a second processing module among all second processing modules;
executing, by the master module in response to the received message information learning request, a self-learning operation corresponding to the message information learning request, so as to obtain a message information learning result; and
updating, by the master module according to the message information learning result, the message processing information table of the IP core where the master module is located; and/or, sending, by the master module, the message information learning result to a corresponding slave module, so that the corresponding slave module updates, according to the message information learning result, the message processing information table of the IP core where the slave module is located, wherein the slave module is a second processing module among all second processing modules except the master module.

2. The method according to claim 1, wherein receiving, by the master module of the Ethernet switching chip, the message information learning request comprises:
receiving, by the master module, the message information learning request sent by the first processing module of the IP core where the master module is located;
or,
receiving, by the master module, the message information learning request sent by the slave module, wherein the message information learning request sent by the slave module is received by the first processing module of the IP core where the slave module is located.

3. The method according to claim 2, wherein the method further comprises:
querying, by the first processing module from the message processing information table of the IP core where the first processing module is located, a message processing strategy corresponding to the received message, so as to perform corresponding processing on the received message according to the found message processing strategy, wherein
the first processing module sends the message information learning request to the second processing module of the IP core where the first processing module is located in a case where one of following conditions is met:

the first processing module does not find, from the message processing information table of the IP core where the first processing module is located, the message processing strategy corresponding to the received message; or the first processing module fails to perform corresponding processing on the received message according to the found message processing strategy.

4. The method according to claim 3, wherein the corresponding processing on the received message comprises: forwarding processing, discarding processing, or modifying a message priority field.

5. The method according to claim 1, wherein when the message processing information table is updated, a corresponding module adds a message processing strategy corresponding to the message information learning result into the message processing information table of the IP core where the corresponding module is located; or, the corresponding module modifies, according to the message processing strategy corresponding to the message information learning result, a corresponding message processing strategy in the message processing information table of the IP core where the corresponding module is located.

6. The method according to claim 1, wherein sending, by the master module, the message information learning result to the corresponding slave module comprises:

sending, by the master module, the message information learning result to the corresponding slave module via a first interface provided on the IP core where the master module is located, and a second interface provided on the IP core where the corresponding slave module is located.

7. The method according to claim 1, wherein the method further comprises:

sending, by the second processing module, an updating request to the first processing module of the IP core where the second processing module is located, so that the first processing module updates, according to the updating request, the message processing information table of the IP core where the first processing module is located, wherein the updating request at least contains the message information learning result.

8. The method according to claim 1, wherein the method further comprises:

starting to update, by the master module, after a preset time delay and according to the message information learning result, the message processing information table of the IP core where the master module is located, wherein the preset time delay is a difference value between a first moment and a second moment, the first moment is a moment when the master module sends the message information learning result to the corresponding slave module, and the second moment is a moment when the corresponding slave module receives the message information learning result.

9. An Ethernet switching chip, comprising: a processor, and a memory configured to store a computer program executable on the processor, wherein the processor is configured to execute the operations of the method according to claim 1 when running the computer program.

10. A non-transitory computer-readable storage medium, wherein a computer program is stored in the non-transitory computer-readable storage medium, and when executed by a processor, the computer program implements the operations of the method according to claim 1.

11. The method according to claim 1, further comprising:

configuring the second processing module of an IP core of the Ethernet switching chip to be a master module, and configuring one or more second processing modules of one or more other IP cores to be one or more slave modules, so as to obtain a master module and at least one slave module.

12. The method according to claim 1, wherein the IP core where the master module is located is determined to be a master IP core, and the IP core where the slave module is located is determined to be a slave IP core.

13. The method according to claim 1, wherein after the second processing module of an IP core of the Ethernet switching chip is configured to be the master module, a third processing module of the master IP core performs, via a Peripheral Component Interconnect express (PCIe) bus, information interaction with a CPU of a switch that is provided with the Ethernet switching chip.

14. The method according to claim 13, wherein after a user redetermines the master module, the PCIe bus between the third processing module of the original master IP core and the CPU is disconnected, and the third processing module of the redetermined new master IP core is connected to the CPU via the PCIe bus.

15. The method according to claim 1, wherein the message processing information table comprises: a dedicated information table and/or a global information table.

16. The method according to claim 15, wherein the dedicated information table is used for storing a message processing strategy associated with an IP core of the Ethernet switching chip, and is only stored in the corresponding IP core; and the dedicated information table comprises an interface attribute information table, wherein an index ID contained in the interface attribute information table is an interface ID.

17. The method according to claim 15, wherein the global information table is used for storing message processing strategies associated with all IP cores of the Ethernet switching chip, and is stored in each IP core of the Ethernet switching chip; and the global information table comprises: message forwarding information tables, and/or, public resource information tables.

18. The method according to claim 1, wherein the self-learning operation corresponding to the message information learning request is a self-learning operation of information including at least one of: a source IP address, a source port, a destination IP address, a destination port, and a transport layer protocol.

19. The method according to claim 18, wherein the message information learning result comprises information obtained by the master IP core through the self-learning operation, and the information comprises at least one of: a source IP address, a source port, a destination IP address, a destination port, a transport layer protocol, and a storage location of the corresponding information in a message processing information table.

20. An Ethernet switching chip, containing at least two Intellectual Property (IP) cores, wherein each IP core at least contains a first processing module and a second processing module; the first processing module is configured to perform corresponding processing on a received message according to a message processing information table stored in the IP core where the first processing module is located; the second processing module is configured to update the message processing information table; a second processing module among all second processing modules is a master module; the second processing modules among all second processing modules except the master module are slave modules, wherein
    the master module is configured to:
    receive a message information learning request;
    in response to the received message information learning request, execute a self-learning operation corresponding to the message information learning request, so as to obtain a message information learning result; and
    update, according to the message information learning result, the message processing information table of the IP core where the master module is located; and/or, send the message information learning result to a corresponding slave module, so that the corresponding slave module updates, according to the message information learning result, the message processing information table of the IP core where the slave module is located.

* * * * *